United States Patent Office 2,904,387
Patented Sept. 15, 1959

2,904,387

COMPOSITION AND PROCESS FOR CREASE- AND WRINKLEPROOFING CELLULOSIC TEXTILE MATERIAL

Robert L. Holbrook, Riderwood, Md., and Richard L. Doerr, Niagara Falls, N.Y., assignors to Olin Mathieson Chemical Corporation, a corporation of Virginia No Drawing. Application April 28, 1958
Serial No. 731,146

18 Claims. (Cl. 8—116.3)

This invention relates to the impregnation of cellulosic textiles in order to make them resistant to creasing and wrinkling.

It is well known that textiles are easily wrinkled in use, and that such wrinkling is undesirable. Thus, untreated wearing apparel generally requires frequent pressings in order to maintain an acceptable appearance of the garments.

Various compounds have been impregnated into textiles in order to alleviate wrinkling and creasing, the most common ones being urea-formaldehyde resins, cyclic ethyleneurea-formaldehyde resins, melamine-formaldehyde resins, guanazole-formaldehyde resins and urazole-formaldehyde resins and certain ethers bearing epoxy groups on opposite ends of the molecule. Such compounds are able to impart varying degrees of crease-resistance giving rise to textiles called "minimum care fabrics" which require little or no pressing after laundering. The degree of crease-resistance attained depends upon the type of agent applied, the amount applied, and the method of curing the anti-wrinkling agent after it is applied to the cloth.

In practice, however, the maximum crease-resistance which any agent is capable of rendering is seldom employed. Prior creaseproofers generally have an adverse effect on the strength of textiles. As the degree of crease-proofing with any given agent is increased, there is an accompanying increase in fiber degradation resulting in greater tearability and tensile strength loss, less desirable hand or general feel of the textile, and increase in chlorine retention upon bleaching which results in discoloration and a further weakening of the textile fibers. Thus the creaseproofing which has been done with such agents as mentioned above has been a compromise between maximum creaseproofing and minimum fiber degradation. No prior creaseproofing agents have been excellent in both characteristics as well as economical.

In accordance with this invention, there has now been discovered a class of reaction products which are superior creaseproofing agents, in that they exhibit negligible chlorine retention and fiber degradation due to such chlorine retention compared to prior nitrogen-containing substances and are still able to impart high degrees of crease-resistance to cellulosic textiles, such as cotton, linen and regenerated cellulose. The products produce a durable crease-proofed finish which is not readily removed by washing or laundering and which is compatible with other textile-treating agents such as softeners, water repellants, dyes, etc. In addition, the treatment of the present invention imparts mildew-resistant properties to cotton, particularly important in tarpaulins or other cotton materials which may be in contact with soil for extended periods. Furthermore, the reaction products of this invention can be readily and economically prepared from commercially available chemicals.

The creaseproofers are reaction products of formaldehyde (including convenient sources thereof such as paraformaldehyde) and dihydrazides of the general formula $R(CONHNH_2)_2$, wherein R is $(-CH_2-)_n$ wherein $n$ is 0 to 5, or mixtures of such dihydrazides, for example oxalic, malonic, succinic, glutaric, adipic and pimelic. Dihydrazides containing alkylene groups having more than 5 carbon atoms produce reaction products which are inferior creaseproofers in comparison with those produced by dihydrazides of the above class. The creaseproofers can be prepared by reacting from 4 to 20 or more moles of formaldehyde (preferably from 6 to 15 moles of formaldehyde) and one mole of the dihydrazide in aqueous solution under slightly acidic to alkaline conditions at a pH of about 6–11 and preferably about 7.5 to 9.5. The reaction is carried out preferably from about 10° C. to about 50° C. although lower and higher temperatures can be used. The reaction products thus produced are soluble in water. The solution so prepared, containing preferably about 4 to 20% or more by weight of the reaction product, can be applied to the cellulosic textile directly. However, a more durable finish is obtained if the reaction product of formaldehyde and dihydrazide is allowed to stand for up to about 24 hours. After this time the solution, which becomes more acid as it stands, is padded onto a cellulosic textile or made neutral or alkaline, for example with dilute caustic, and padded onto the textile.

In accordance with the invention an aqueous solution prepared as described above and containing from 4 percent to 20 percent or more by weight of the reaction product of 4 to 20 or more moles of formaldehyde with one mole of the dihydrazide or mixture of dihydrazides is padded onto the cloth, in the usual manner and preferably while the padding bath has a pH of from about 5 to about 7, to the extent that the dry pick-up or add-on is between about 3 percent and 25 percent by weight, based upon the weight of the dry cloth. An add-on or dry pick-up of over 25 percent can be used but there is generally insufficient added advantage to justify this. About 0.1 percent to 2 percent by weight of a catalyst, based on the weight of the padding bath, can be added to the padding bath to facilitate the curing step and to produce a more durable finish. Examples of suitable catalysts are magnesium chloride, aluminum chloride, aluminum formate, aluminum tartrate, p-toluene sulphonic acid, its ammonium and amine salt and other salts of amines, for example methylamine hydrochloride and piperidine hydrochloride.

The curing step, i.e., the reaction of the formaldehyde-dihydrazide reaction product with the textile, is carried out by standard procedure. Thus, the wet textile is subjected to drying at an elevated temperature, for example 180°–250° F., and then further heated to effect the curing. Complete cure can be obtained by heating at 300° F. to 400° F. for 2 to 10 minutes. The curing period is temperature dependent and can be varied over a wide range. Thus, complete curing can also be attained in 15 to 60 seconds at 500° F. After the cloth has been cured it can be finished according to standard textile mill procedures. An alkaline scour generally follows the crease-proofing process to remove any excess, unreacted crease-proofing agent and to improve the hand, or feel, of the cloth. Normal finishing operations can include calendaring, framing, blueing, compressive shrinking, etc.

It is believed that the creaseproofing compositions of this invention react with the textile fibers and do not merely exist physically within the fibers. This is shown by the inertness of the creaseproofed textiles of this invention to acid and alkaline scouring solutions. In contrast, the reaction products of dihydrazides and formaldehyde, when prepared according to this invention and cured but not applied to cellulosic textiles are generally softened, swollen or dissolved by hot water. Furthermore it has been reported (Textile Research Journal, 26, 940–7 (1956)

by E. E. Linekin, et al.) that melamine-formaldehyde resins and urea-formaldehyde resins react with cellulose and that this reaction product is responsible for imparting antiwrinkling properties to the textiles.

The reduced chlorine retention inherent in the present creaseproofing agents is essential in maintaining fiber strength. Other nitrogen-containing creaseproofing agents generally retain sufficient chlorine from bleaching baths to seriously damage textile fibers, and certain of them are so objectionable in this respect that they cannot be used on textiles which are to be bleached.

The following examples further illustrate the invention and demonstrate the superiority of the formaldehyde dihydrazide creaseproofing compositions. In the examples, the term "mole" signifies gram moles.

Example I

About 1.62 moles of formaldehyde in the form of a 37 percent by weight aqueous solution were mixed with 1170 milliliters of water, and 0.27 mole of adipic acid dihydrazide was slowly added thereto, with stirring, while maintaining the pH of the entire mixture at 9.5 by the slow addition of dilute (10 weight percent) aqueous caustic. The resulting solution was then stirred at room temperature for 30 minutes.

Four grams of magnesium chloride hexahydrate was added to the above described solution, resulting in a pH change to 8.7, and the solution was padded, at room temperature, on six cuttings of Indian Head cotton, using a standard textile padder with the roll pressure adjusted to give 110 weight percent wet pick-up. Each cutting was dried on a dry can for 4 minutes at 200° F. and cured for 4 minutes at 325° F.

The following table indicate the performance of the adipic dihydrazide-formaldehyde formulation:

| Cuttings | Dry pick-up, wt. percent | Crease Angle, degrees | Tearability loss, percent | Tensile strength loss, percent |
|---|---|---|---|---|
| A | 5.4 | 109 | 20 | 8.4 |
| B | 5.0 | 105 | 22 | 4.5 |
| C | 4.8 | 110 | 20 | 5.4 |
| D | 5.0 | 108 | 25 | 0 |
| E | 5.7 | 107 | 25 | 7.4 |
| F | 5.8 | 109 | 23 | 6.7 |
| G (Blank) | | 75 | | |

The crease angle was determined (AATCC tentative test method 66–53) by folding the cloth in half under slight pressure and measuring the angle between the halves after releasing the pressure. Thus, the angle of 180° represents the maximum angle obtainable, i.e., the cloth recovered completely and is flat. The tearability, i.e. resistance to tearing or shearing, of the cloth was determined on an Elemendorf Tearability Tester. The tensile strength was measured by means of a Scott Tensile Tester. In this test the cloth is subjected to a stretching force, without testing or shearing.

Example II

The following indicates the performance of several creaseproofers described in this invention. The commercial cyclic ethyleneurea-formaldehyde product is included for comparison.

Several cuttings of India Head cotton were padded with aqueous solutions of each of the materials listed by means of a standard textile padder. Each cutting was then dried on a dry can for 4 minutes at 200° F., and cured in a curing oven for 4 minutes at 325° F. One mole portions of each of the dihydrazides were reacted with 6 moles of formaldehyde in aqueous solution and the aqueous mixture so obtained was padded onto the cloth.

| Creaseproofing Agent | Dry pick-up, percent by wt. | Catalyst, percent by wt. | Crease angle, degrees | Tensile strength, percent loss | Tearability, percent loss |
|---|---|---|---|---|---|
| Blank | | | 76 | | |
| Cyclic ethyleneurea-formaldehyde | 10 | MgCl₂ 10 | 120 | 40 | 38 |
| Adipic dihydrazide-formaldehyde | 5.5 | MgCl₂ 3 | 108 | 7.3 | 26 |
| Succinic dihydrazide-formaldehyde | 10 | none | 117 | 16 | 34 |
| Glutaric dihydrazide-formaldehyde | 10 | none | 126 | 14 | 41 |

These results demonstrate the low tensile strength loss, after creaseproofing, with the dihydrazide-formaldehyde products, as well as the excellent resiliency imparted to the cloth.

Example III

The fiber damage resulting from chlorine retention was determined for several of the creaseproofers of this invention, and for several commercial materials. The test (Tentative Test Method AATCC 69–52) involves soaking a piece of the creaseproofed cloth in a dilute sodium hypochlorite solution to simulate bleaching. The cloth is then dried and given a standard scorch by heating it between electrically heated metal plates, hinged and weighted so that a test specimen may be pressed at a definite temperature under a definite pressure. The cloth is then given a tensile strength test and the loss in tensile strength is recorded in percent. Thus, if the force required to tear the treated cloth is three-fourths of that required to tear the creaseproofed but unbleached cloth, the tensile strength loss is said to be 25 percent.

When the above-described test was performed on a typical commercial cyclic ethyleneurea-formaldehyde creaseproofing agent, using Indian Head cotton, the tensile strength loss was found to be 75 percent and the originally white cloth was discolored to a greenish yellow. Prior nitrogen-containing creaseproofers generally retain chlorine from bleaching baths to the extent that fiber damage is from about 50 to 90 percent. The creaseproofers of this invention generally retain insufficient chlorine to cause a 20 percent loss in fiber strength. When a cutting of Indian Head cotton was tested by the above procedure, after being padded with an adipic dihydrazide-formaldehyde formulation (molar ratio 1:6) to the extent of 5 percent add-on, it was found that the tensile strength loss was only 13 percent and that no color developed in the cloth.

Example IV

The following table lists typical data obtained when the creaseproofers of this invention are employed in an acidic padding bath (A), in a bath containing no catalyst (B), and where the molar ratio of formaldehyde to dihydrazide is only 4:1 (C).

The creaseproofing bath was prepared by slowly adding the adipic dihydrazide to the aqueous formaldehyde, with stirring at room temperature, while maintaining the pH of the mixture at 9.0 to 9.5 by slow, incremental addition of dilute aqueous caustic.

Indian Head cotton, having a crease angle of about 75°, was padded in a conventional textile padder, dried on a dry-can, and cured in an oven. The crease angle was determined by AATCC tentative test method 66–53, the tensile strength by means of a Scott Tensile Tester, and the tearability by means of an Elemendorf Tearability Tester.

These results further illustrate the versatility of the creaseproofing agents of this invention. Thus, they can also be successfully applied from an acid padding bath and without a catalyst, although the presence of a catalyst seems to promote the reaction between the crease-proofer and the cellulose and thus provides a more durable finish.

|  | A | B | C |
|---|---|---|---|
| Moles adipic dihydrazide | 0.25 | 0.216 | 0.2. |
| Moles formaldehyde as 37% aqueous solution | 1.44 | 1.730 | 0.8. |
| Water added to make final concentration (per cent by wt.) | 10 | 10 | 10. |
| Catalyst (percent by weight based on the weight of the adduct) | 10% $MgCl_2$ | none | 10% $MgCl_2$. |
| pH of padding bath during padding | 6.5 | 8.6 | 8.4. |
| Wet pick-up (percent by weight) | 117 | 110 | 112. |
| Dry pick-up (percent by weight) | 6 | 12.1 | 10. |
| Drying temperature | 220° F | 220° F | 220° F. |
| Drying time | 4 min | 4 min | 4 min. |
| Curing temperature | 400° F | 325° F | 320° F. |
| Curing time | 4 min | 4 min | 4 min. |
| Crease angle | 128° | 125° | 97.7°. |
| Tensile strength loss | 25% | 15.3% | 9.8%. |
| Tearability loss |  | 44.4% | 42.2%. |

Example V

About 8.0 pounds of adipic dihydrazide was slowly added to 22 pounds of 38 percent by weight aqueous formaldehyde at room temperature with constant stirring while the pH was maintained at 9 to 10 by slow addition of dilute aqueous caustic. When the reaction was complete, enough water was added to make the final concentration of the adduct about 11 percent by weight, and 14.1 percent by weight of magnesium chloride hexahydrate, based on the weight of the dihydrazide-formaldehyde adduct, was dissolved in the final solution. The pH of this solution was changed to about 4.5 by adding sulfuric acid, maintained there for 1 minute, and increased to 7.4 by the addition of dilute caustic.

A pink stripe cotton broadcloth, having an initial crease angle of about 70° was padded with the above-described solution and the following data were recorded:

Wet pick-up (percent by weight) _____ 80
Curing temperature, ° F. (after drying) _____ 350
Curing time, minutes _____ 2

| Crease angle, degrees | | Chlorine Retention | Wash and Wear Rating |
|---|---|---|---|
| After Scouring | After cotton laundry | | |
| 136 | 125 | None | 4 |

The wash and wear rating is a comparative test in which the values range from 1 (very poor) to 5 (no wrinkles). The test is made by subjecting the treated cloth to a standard laundering and allowing it to drip dry. The dry, unironed cloth is then rated by comparing it to 5 photographs of cloths having wash and wear values from 1 to 5. The above value of 4 represents wash and wear properties superior to most commercial finishes.

Example VI

About 35 grams of paraformaldehyde was suspended in 614 milliliters of distilled water at room temperature. The pH adjusted to and maintained at 9.0 with dilute caustic while 52 grams of adipic dihydrazide were added to the mixture, with stirring, until a homogeneous solution was obtained. A standard laboratory textile padder was used to pad Indian Head cotton, having an initial crease angle of about 78°, with the solution to the extent that the dry pick-up was 8.2%. The padding was done at a pH of 7 with no catalyst present. The cloth was dried and then cured at 340° F. for 10 minutes. The crease angle of the cloth was then 112° with an accompanying tensile strength loss of 21 percent.

Example VII

The following solutions were made up by dissolving glutaric dihydrazide in water and slowly adding this solution to aqueous formaldehyde. The catalyst was then added, the percent shown being based on the weight of the solution. After padding these solutions on cuttings of the particular cloth shown, to the extent of the wet pick-up listed, the cloths were dried and cured at the temperature shown for the period shown. Average crease angles and tensile strengths for the cloths appear at the bottom of each column:

|  | Cotton | Linen | Linen | Regenerated Cellulose |
|---|---|---|---|---|
| Water, grams | 91.0 | 84 | 84 | 90.00 |
| $CH_2O$, grams | 6.0 | 6.0 | 6.0 | 4.8 |
| Hydrazide, grams | 1.7 | 3.3 | 3.3 | 3.2 |
| Mole Ratio $CH_2O$/hydrazide | 20:1 | 10:1 | 10:1 | 8:1 |
| $MgCl_2$, percent | 0.7 | 0.5 | 0.8 | [1] APTS 1.0 |
| Wet pick-up, percent | 84 | 89 | 86 | 91 |
| Cure temperature, ° F | 370 | 350 | 370 | 330 |
| Cure time, minutes | 3 | 4 | 2 | 5 |
| Crease angle, degrees | 127 | 130 | 126 | 129 |
| Tensile strength, pounds | 26 | 46 | 49 | 29 |

[1] Ammonium p-toluene sulfonate.

Example VIII 6.08 grams of oxalic dihydrazide was slowly added to 37.6 grams of 37% aqueous formaldehyde in 153.76 grams of water while maintaining the pH of the mixture at about 8.5 by incremental addition of aqueous caustic. After about one-half hour, 2.56 grams of magnesium chloride hexahydrate was added to the solution and it was padded onto 78–84 cotton sheeting to the extent of a 98% by weight wet pick-up. The cloth was dried on a steam can and then cured for 4 minutes at 360° F. After scouring, the cloth had a 128° crease angle and an average tensile strength of 32 pounds as compared to original values of about 65° and about 65 pounds.

This application is a continuation-in-part of co-pending application Serial No. 658,226, filed May 10, 1957, now abandoned, and is also a continuation-in-part of co-pending application Serial No. 669,974, filed July 5, 1957, now abandoned. In applicants' pending application S.N. 731,147, filed April 28, 1958, solutions of reaction products of formaldehyde and hydrazides of dibasic acids in which the carbon chain is interrupted by one or two oxygen or sulfur atoms in the form of ether or thioether linkages, are disclosed, as well as their use in the treatment of cellulosic textiles in order to make them resistant to creasing and wrinkling.

What is claimed is:

1. A method for the impregnation of a textile fabricated from a material selected from the group consisting of cellulose and regenerated cellulose to render it resistant to creasing and wrinkling which includes the steps of impregnating the textile with a solution of a reaction product of formaldehyde and a dihydrazide of the formula $R(CONHNH_2)_2$ obtained by reacting formaldehyde and the dihydrazide at a pH of from 6 to 11 in a molar ratio of formaldehyde to the dihydrazide within the range from 4 to 20, said reaction product being soluble in water to the extent of at least 4 percent, and heating the impregnated textile to dry it and provide a textile resistant to creasing and wrinkling, R being $(-CH_2-)_n$ wherein $n$ is 0 to 5.

2. The method of claim 1 wherein R is a polymethylene group.

3. The method of claim 1 wherein $R(CONHNH_2)_2$ is adipic acid dihydrazide.

4. The method of claim 1 wherein $R(CONHNH_2)_2$ is succinic acid dihydrazide.

5. The method of claim 1 wherein $R(CONHNH_2)_2$ is glutaric acid dihydrazide.

6. The method of claim 1 wherein said solution utilized in the step of impregnating the textile contains from 0.1 to 2 percent by weight of an acid-acting curing catalyst.

7. The method of claim 1 wherein said textile is cotton.

8. The method of claim 7 wherein said catalyst is magnesium chloride.

9. The method of claim 7 wherein said catalyst is ammonium p-toluene sulfonate.

10. A textile fabricated from a material selected from the group consisting of cellulose and regenerated cellulose which has been rendered resistant to creasing and wrinkling by the process of claim 1.

11. A cotton textile which has been rendered resistant to creasing and wrinkling by the process of claim 1.

12. A cotton textile which has been rendered resistant to creasing and wrinkling by the process of claim 3.

13. A cotton textile which has been rendered resistant to creasing and wrinkling by the process of claim 4.

14. A cotton textile which has been rendered resistant to creasing and wrinkling by the process of claim 5.

15. A composition of matter suitable for use in the impregnation of a textile fabricated from a material selected from the group consisting of cellulose and regenerated cellulose to render it resistant to creasing and wrinkling consisting essentially of a solution containing at least 4 percent by weight of a reaction product of formaldehyde and a dihydrazide of the formula $R(CONHNH_2)_2$ obtained by reacting formaldehyde and the dihydrazide at a pH from 6 to 11 in a molar ratio of formaldehyde to the dihydrazide within the range from 4 to 20, R being $(-CH_2-)_n$ wherein $n$ is 0 to 5.

16. The composition of claim 15 wherein $$R(CONHNH_2)_2$$

is adipic acid dihydrazide.

17. The composition of claim 15 wherein $$R(CONHNH_2)_2$$

is succinic acid dihydrazide.

18. The composition of claim 15 wherein $$R(CONHNH_2)_2$$

is oxalic acid dihydrazide.

References Cited in the file of this patent

UNITED STATES PATENTS

| | | |
|---|---|---|
| 2,161,808 | Finlayson et al. | June 13, 1939 |
| 2,317,756 | Graenacher et al. | Apr. 27, 1943 |
| 2,391,942 | Burke | Jan. 1, 1946 |
| 2,509,183 | Auten | May 23, 1950 |
| 2,597,467 | Fisher et al. | May 20, 1952 |
| 2,668,154 | Orth | Feb. 2, 1954 |
| 2,845,400 | Rudner | July 29, 1958 |